United States Patent
Xu et al.

(10) Patent No.: US 11,540,183 B2
(45) Date of Patent: Dec. 27, 2022

(54) CONSECUTIVE CONDITIONAL HANDOVERS

(71) Applicant: Apple Inc., Cupertino, CA (US)

(72) Inventors: Fangli Xu, Beijing (CN); Haijing Hu, Los Gatos, CA (US); Yuqin Chen, Beijing (CN); Ehsan Haghani, Redwood City, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 16/985,952

(22) Filed: Aug. 5, 2020

(65) Prior Publication Data
US 2021/0051534 A1   Feb. 18, 2021

(30) Foreign Application Priority Data

Aug. 14, 2019 (CN) .................. 201910746658.X

(51) Int. Cl.
  *H04W 36/08* (2009.01)
  *H04W 36/00* (2009.01)
  *H04W 36/38* (2009.01)

(52) U.S. Cl.
  CPC ....... *H04W 36/0055* (2013.01); *H04W 36/08* (2013.01); *H04W 36/38* (2013.01)

(58) Field of Classification Search
  CPC . H04W 36/0055; H04W 36/08; H04W 36/38; H04W 36/36
  See application file for complete search history.

(56) References Cited

U.S. PATENT DOCUMENTS

| | | | |
|---|---|---|---|
| 2017/0118700 A1* | 4/2017 | Lee | H04W 48/20 |
| 2017/0353897 A1* | 12/2017 | Wang | H04W 36/08 |
| 2019/0223073 A1* | 7/2019 | Chen | H04W 36/0079 |
| 2019/0246323 A1 | 8/2019 | Kim | |
| 2019/0281511 A1* | 9/2019 | Susitaival | H04W 36/36 |
| 2019/0363843 A1* | 11/2019 | Gordaychik | H04W 52/58 |
| 2020/0022042 A1 | 1/2020 | Yin | |
| 2020/0029251 A1 | 1/2020 | Wu | |
| 2020/0077314 A1* | 3/2020 | Hwang | H04W 76/27 |
| 2020/0084683 A1 | 3/2020 | Moosavi | |
| 2020/0154327 A1 | 5/2020 | Koskela | |

(Continued)

OTHER PUBLICATIONS

Apple Inc.; "Improvements on HO Robustness in LTE"; 3GPP TSG-RAN WG2 Meeting #104 R2-1817474; Spokane, USA; Nov. 12, 2018; 6 Pages.

(Continued)

*Primary Examiner* — Barry W Taylor
(74) *Attorney, Agent, or Firm* — Kowert, Hood, Munyon, Rankin & Goetzel, P.C.

(57) ABSTRACT

This disclosure relates to techniques for performing consecutive conditional handovers. A cellular base station may provide conditional handover information for multiple conditional handovers to a wireless device. The conditional handover information may include information for performing a conditional handover from a cell provided by the cellular base station to at least one cell, and information for performing a conditional handover from one or more of those cells to at least one cell. The wireless device may perform multiple consecutive conditional handovers using the conditional handover information.

19 Claims, 13 Drawing Sheets

(56) References Cited

U.S. PATENT DOCUMENTS

| | | | | |
|---|---|---|---|---|
| 2020/0267604 A1* | 8/2020 | Hwang | ............ | H04W 36/0016 |
| 2020/0351694 A1* | 11/2020 | Chen | ..................... | H04W 36/36 |
| 2020/0351731 A1* | 11/2020 | Kim | ................. | H04W 36/0072 |
| 2021/0022055 A1* | 1/2021 | Tseng | ................... | H04W 24/10 |
| 2021/0105690 A1* | 4/2021 | Wu | ....................... | H04W 36/24 |
| 2021/0112475 A1* | 4/2021 | Kim | ..................... | H04W 36/36 |
| 2021/0176682 A1* | 6/2021 | Guo | ..................... | H04W 36/34 |

OTHER PUBLICATIONS

Apple Inc.; "Enhancements for Conditional Handover"; 3GPP RAN WG2 Meeting #106 R2-1907216; Reno, NV; May 8, 2019; 8 Pages.

Apple Inc.; "Consecutive Conditional Handover"; 3GPP TSG-RAN WG2 Meeting #108 R2-19145133 (Resubmission of R2-19121464); Reno, USA; Nov. 18, 2019; 8 pages.

Extended European Search Report for Patent Application No. EP 20190715; dated Dec. 17, 2020; 15 pages.

Umar Karabulut, et al.; "Analysis and Performance Evaluation of Conditional Handover in 5G Beamformed Systems",Vodafone Chair Mobile Communications Systems, Technical University Dresden, Nomor Research GmbH, Munich, German: Barkhausen Institute gGmbH, Dresden, Germany; arXiv:1910.11890v2 [cs.NI], Nov. 4, 2019, 7 pages.

* cited by examiner

CONSECUTIVE CONDITIONAL HANDOVERS

PRIORITY DATA

This application claims benefit of priority to Chinese Application No. 201910746658.X, titled "Consecutive Conditional Handovers", filed Aug. 14, 2019, which is hereby incorporated by reference in its entirety as though fully and completely set forth herein.

FIELD OF THE INVENTION

The present application relates to wireless communications, and more particularly to systems, apparatuses, and methods for performing consecutive conditional handovers.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), 5G NR, LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through wireless devices used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY OF THE INVENTION

Embodiments are presented herein of apparatuses, systems, and methods for performing consecutive conditional handovers.

According to the techniques described herein, it may be possible for a cellular base station to configure a wireless device served by the cellular base station with information supporting potential early conditional handover to multiple cells. In particular, conditional handover information capable of supporting multiple consecutive conditional handovers, such as from a serving cell provided by the cellular base station to another cell, and from that other cell to a further cell, may be obtained by the cellular base station using conditional handover requests to other cellular base stations. The conditional handover information may be provided to the wireless device as part of a conditional handover command, and the wireless device may use the conditional handover information to perform conditional handover when the conditions indicated in the conditional handover information are met. The wireless device may retain the conditional handover information after performing the conditional handover, such that one or more further conditional handovers may be performed by the wireless device using the same conditional handover information, e.g., similarly if the conditions indicated in the conditional handover information are met.

Such techniques may help minimize handover signaling and improve handover reliability, particularly in high speed/high mobility/high density scenarios in which in-time signaling may be vulnerable to rapidly changing channel conditions, and may help reduce data losses, gaps, and stalls that could be caused by such less reliable handover operations, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
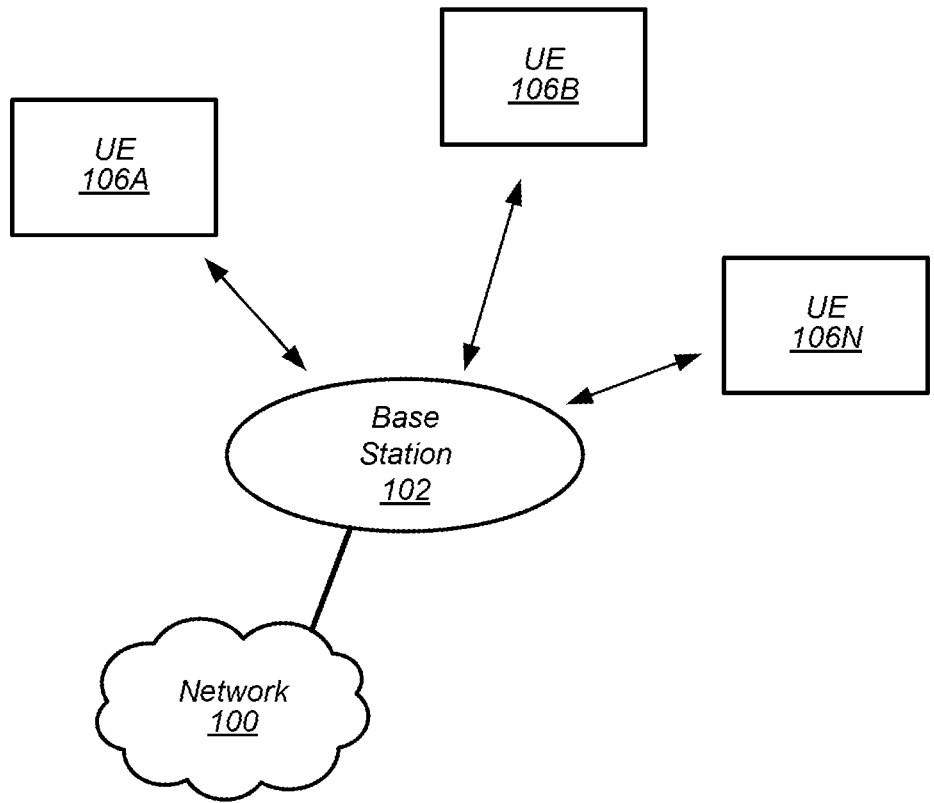
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
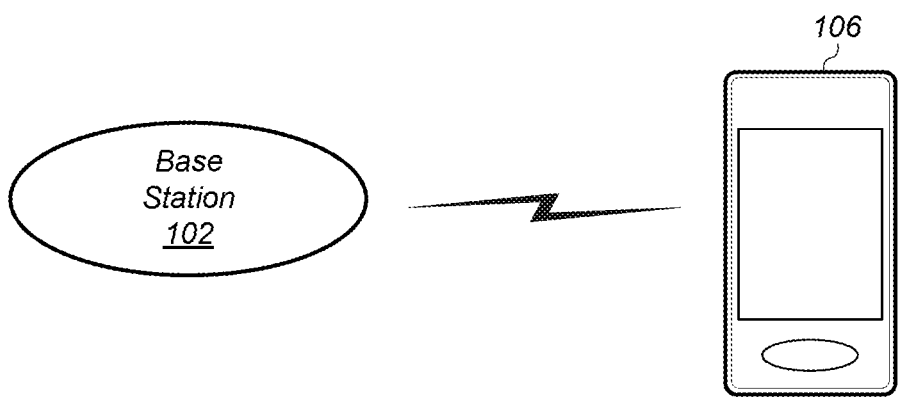
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform consecutive conditional handovers, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a media player, a computer, a laptop, a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM, etc.), and separate radios for communicating using each of Wi-Fi and BLUETOOTH™. Other configurations are also possible.

Figure 3:
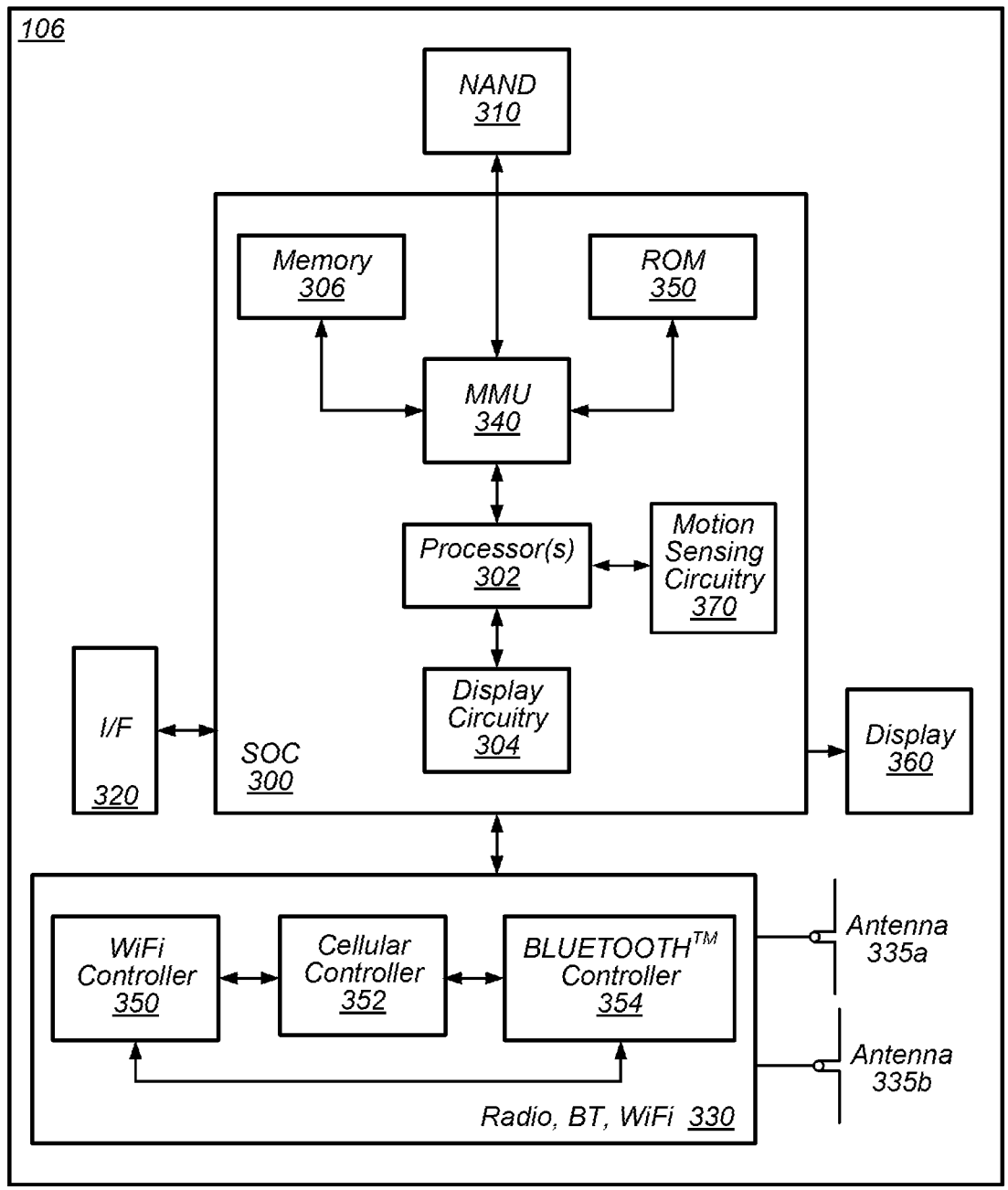
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform consecutive conditional handovers. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform consecutive conditional handovers according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 352 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 352 may include hardware and/or software components for generating Wi-Fi physical layer preamble signals, e.g., for transmitting as part of uplink communications by the UE 106 that occur in unlicensed frequency bands.

Figure 4:
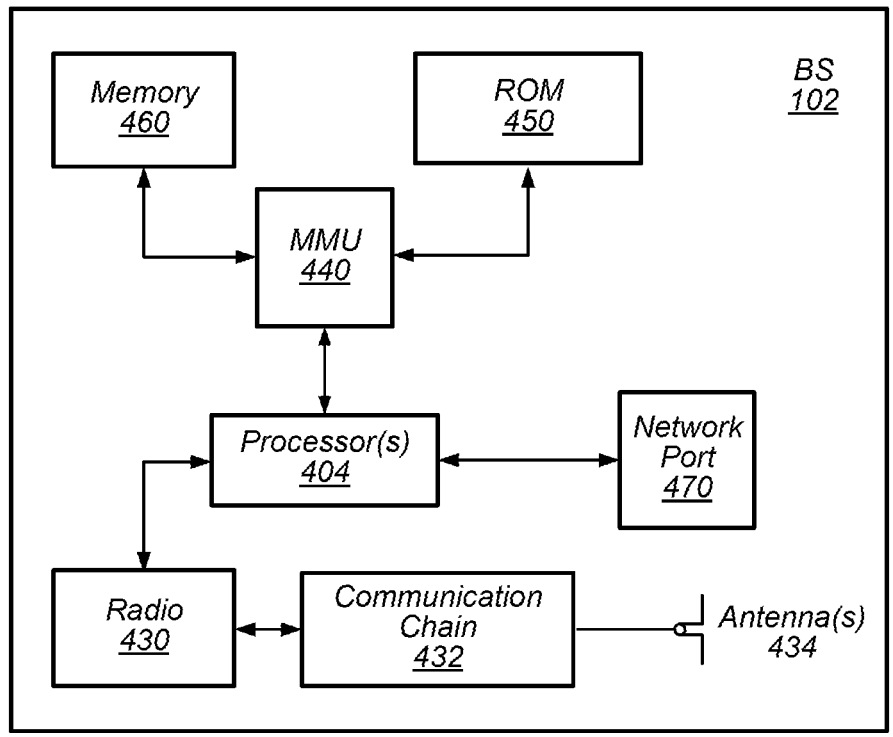
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. For example, the core network may include a mobility management entity (MME), e.g., for providing mobility management services, a serving gateway (SGW) and/or packet data network gateway (PGW), e.g., for providing external data connections such as to the Internet, etc. Other configurations are also possible. In some cases, the network port 470 may couple to a telephone network via the core network, and/or the core network may provide a telephone network (e.g., among UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A GSM, UMTS, CDMA2000, Wi-Fi, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard. The base station 102 may operate according to the various methods as disclosed herein for wireless devices to perform consecutive conditional handovers.

Figure 5:
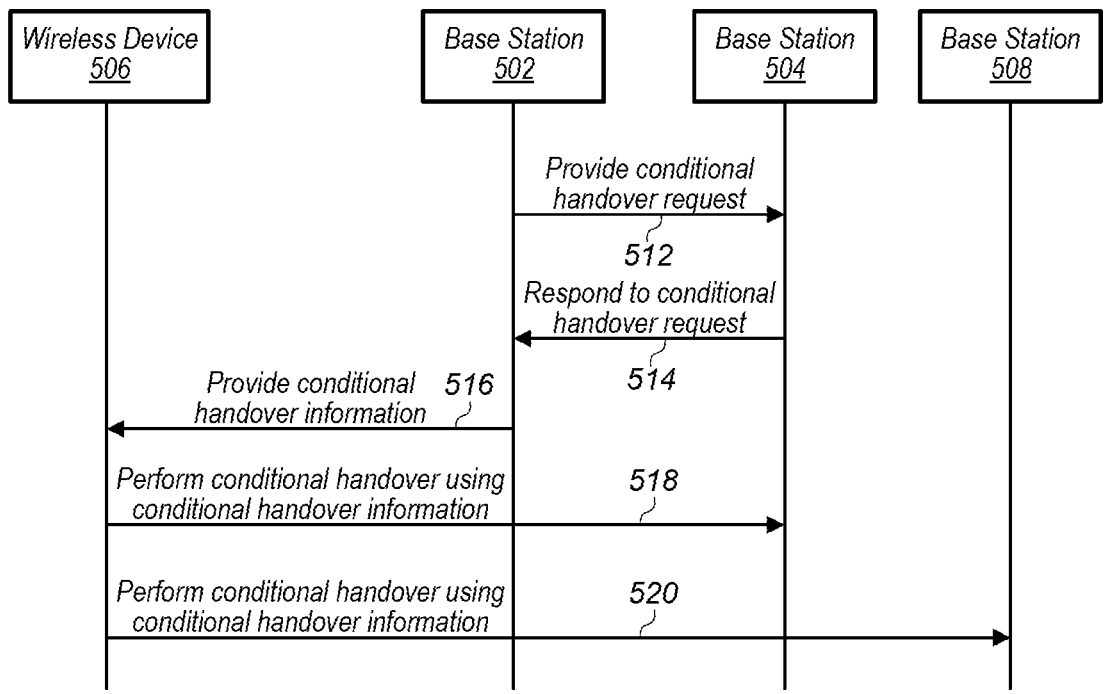
FIG. 5 is a signal flow diagram illustrating aspects of an exemplary possible method for performing consecutive conditional handovers, according to some embodiments.

FIG. 5—Consecutive Conditional Handovers

Wireless devices operating in radio resource control (RRC) connected mode may have their mobility operations managed by the cellular network with which they are registered, e.g., by way of handover operations. In some instances, such handovers can include a serving base station providing signaling to a wireless device configuring (e.g., periodically or in an event-based manner) the wireless device to perform measurements on neighbor cells, receiving signaling including measurement reports from the wireless device based on those measurements, and providing signaling to the wireless device configuring a handover to another cell if certain handover conditions are met.

Use of such in-time signaling between a network and a device to perform handover can allow for dynamic selection of the best cell to which to perform handover at the time that handover is needed. However, such in-time signaling can sometimes lead to handover failures, e.g., as configuring handover in-time may commonly occur in relatively weak channel/signal conditions. Such scenarios may occur more commonly in fast moving conditions, in high cell density deployments in frequency ranges with high propagation loss that utilize directional transmissions (beamforming), and/or more generally in scenarios in which channel quality may degrade relatively quickly, at least according to some embodiments.

Accordingly, in some instances, conditional handover may be used, e.g., to reduce reliance on in-time RRC signaling with the source cell at the time of handover, which may make the handover more reliable. Conditional handover may include attempting to pre-deliver handover commands for a cell in advance, e.g., while conditions are good (e.g., when the device is stationary and/or has good signal quality), and allowing the device to handover later, e.g., with a reduced signaling set. Such techniques may help reduce data losses, gaps, and stalls, and may help reduce latency for wireless device handover from one cell to another.

In some instances, it may further be useful to provide conditional handover information supporting multiple (e.g., consecutive) conditional handovers. For example, it may be the case that providing conditional handover information that can support multiple consecutive conditional handovers may reduce the likelihood that handover failure occurs after performing a conditional handover due to a short stay on the target cell of the conditional handover before wireless medium conditions degrade and a further handover is needed. Accordingly, FIG. 5 is a signal flow diagram illustrating an exemplary possible method for performing consecutive conditional handovers, according to some embodiments.

Aspects of the method of FIG. 5 may be implemented by cellular base stations (such as a BS 102 illustrated in and described with respect to various of the Figures herein) and wireless devices (such as a UE 106 illustrated in and described with respect to various of the Figures herein), or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 512, a first cellular base station 502 (e.g., that provides a first cell) may provide a conditional handover request to a second cellular base station 504 (e.g., that provides a second cell). The first cellular base station 502 may provide the conditional handover request request based on determining to provide conditional handover information (e.g., including a conditional handover command) to a wireless device 506 that is served by the first cell. The first cellular base station 502, along with the second cellular base station 504, cellular base station 508, and potentially multiple other cellular base stations, may provide a radio access network that provides an air interface between a cellular core network and the wireless device 506 (e.g., and/or other wireless devices served by the cellular network), at least according to some embodiments.

The conditional handover request request may indicate a set of candidate cells for which to include conditional handover information. For example, the set of candidate cells could include the first cell, the second cell, and a third cell provided by a third cellular base station 508. The cells may be identified by cell frequency (such as E-UTRA Absolute Radio Frequency Channel Number, in an LTE context), physical cell identifier, and global cell identifier, and/or in any of various other ways, according to various embodiments.

In 514, the second cellular base station 504 may respond to the conditional handover request. The response may include any of various possible types of information. As one possibility, the response may include configuration information for the second cell, e.g., for use by the wireless device 506 to determine a configuration to use when transmitting a handover confirmation to the second cell and/or otherwise communicating with the second cell. The configuration information may be provided as full configuration information, or in a delta format, e.g., indicating changes in the configuration for the second cell relative to configuration information for the first cell. As another possibility, the response may include information for performing conditional handover from the second cell to each of the candidate cells indicated in the conditional handover request (e.g., the first cell and the third cell, following the preceding example).

Note that the first cellular base station 502 may similarly provide a conditional handover request to any other cellular base stations that provide cells in the set of candidate cells. Thus, again following the preceding example, it may be the case that the cellular base station also provides a conditional handover request to the third cellular base station 508, which may similarly indicate the set of candidate cells for which to include conditional handover information. Thus, the third cellular base station 508 may similarly respond with configuration information for the third cell and information for performing conditional handover from the second cell to each of the candidate cells indicated in the conditional handover request, in such a scenario. Any other cellular base stations to which a conditional handover request is provided may also respond, and include similar information for the cell(s) provided by the cellular base station(s), in the response(s).

In 516, the first cellular base station 502 may provide conditional handover information (e.g., including a conditional handover command) to the wireless device 506. The conditional handover information may support consecutive conditional handovers by the wireless device 506. For example, the conditional handover information may include information for performing conditional handover from the first cell to one or more other cells and information for performing conditional handover from at least one of those other cells to at least another other cell. As one such possibility, considering again a scenario in which conditional handover information for a set of cells that includes the first cell, the second cell, and the third cell is provided, the conditional handover information may include information for performing conditional handover from the first cell to the second cell and the third cell, information for performing conditional handover from the second cell to the third cell and the first cell, and information for performing conditional handover from the third cell to the second cell and the first cell. Thus, at least in some instances, such conditional handover information could support a "ping-pong" scenario in which the wireless device can perform handover to another cell and then another handover back to the original cell using the conditional handover information.

The conditional handover information may also include configuration information for one or more cells. For example, the conditional handover information may include configuration information for each cell other than the first cell (e.g., as the wireless device 506 may already have configuration information for the first cell since the first cell may be the current serving cell for the wireless device 506) in the set of cells for which the conditional handover information is provided, as one possibility. Thus, again considering a scenario in which the conditional handover information is provided for a set of cells including the first cell, the second cell, and the third cell, the conditional handover information may include configuration information for the second cell and the third cell.

Note that in some instances, the conditional handover information may be provided to the wireless device 506 in a single conditional handover command or in multiple conditional handover commands. For example, as one possibility, the first cellular base station 502 may wait until it has received responses to all of the conditional handover requests it has provided, then provide conditional handover information for all of the cells for which conditional handover information is provided to the wireless device 506 in a single conditional handover command. As another possibility, the first cellular base station 502 may provide conditional handover information for each respective cell for which conditional handover information is provided to the wireless device 506 in its own conditional handover command once the first cellular base station 502 has received a response to the conditional handover request from the cellular base station that provides the respective cell.

The information for performing conditional handover from the first cell to the second cell may specify one or more conditions under which to perform conditional handover from the first cell to the second cell. Similarly, the information for performing conditional handover from the second cell to the third cell may specify one or more conditions under which to perform conditional handover from the second cell to the third cell. More generally, the information for performing conditional handover from one cell to another cell may specify one or more conditions under which to perform conditional handover from the one cell to the other cell. The conditions may include threshold information indicating one or more threshold conditions to be met to perform the conditional handover. The thresholds/conditions may include serving/source cell signal strength (e.g., RSRP) and/or signal quality (e.g., RSRQ) thresholds, candidate/target cell signal strength and/or signal quality thresholds, delta signal strength and/or signal quality thresholds between the serving/source cell and the candidate/target cell, and/or any of various other possible conditions. In some instances, the condition(s) may include an A3 trigger and/or an A5 trigger, e.g., in accordance with 3GPP specification documents. Note that each potential conditional handover may have different thresholds/conditions, or some or all potential conditional handovers may have similar or the same thresholds/conditions for performing conditional handover.

Note that, at least in some instances, the wireless device 506 may provide capability information to the network (e.g., to the first cellular base station 502, or to a previous serving cell) indicating whether the wireless device 506 is capable of supporting conditional handover, indicating whether the wireless device 506 is capable of supporting consecutive conditional handovers, and/or indicating how much conditional handover information the wireless device 506 can support. For example, as storing conditional handover information for a set of cells may require a greater amount of storage capacity for a larger set of cells, the capability information could include an indication of a maximum amount of conditional handover information supported by the wireless device, such as by indicating a maximum cell set size (e.g., maximum number of candidate cells) supported by the wireless device, and/or using any of various other possible metrics or indicators. In such a scenario, the first cellular base station may determine to provide the conditional handover information to the wireless device 506 based at least in part on the capability information for the wireless device 506, potentially including selecting the set of cells for which conditional handover information is provided, and/or determining any of various other possible aspects of the conditional handover information, based at least in part on the capability information.

In 518, the wireless device 506 may perform conditional handover using the conditional handover information received from the first cellular base station 502. For example, if the threshold conditions for performing conditional handover from the first cell to the second cell are met while the wireless device 506 is connected to the first cell, the wireless device 506 may perform conditional handover from the first cell to the second cell using the conditional handover information. In this case, the wireless device 506 may transmit a handover confirmation to the second cell (i.e., the cell to which handover is being performed). Note that it may be the case that performing the conditional handover may not require or include any additional signaling between the wireless device 506 and the previous serving cell (i.e., the first cell, from which handover is being performed) after the threshold conditions for the conditional handover are met, at least in some instances. This may help reduce the likelihood of handover failure, e.g., since at that point the previous serving cell may have become relatively weak and the chance of such signaling being unsuccessful may correspondingly be relatively high.

At least according to some embodiments, the wireless device 506 may retain the conditional handover information received from the first cellular base station 502 after performing conditional handover. Thus, the wireless device 506 may be able to use the stored conditional handover information to perform one or more additional conditional handovers using the same conditional handover information, if the conditions for one or more additional conditional handovers are met. In other words, it may be possible for the wireless device 506 to perform multiple consecutive conditional handovers using the conditional handover information provided to the wireless device 506, e.g., potentially without needing any further handover commands from the network.

For example, as illustrated, in 520, the wireless device 506 may further perform conditional handover using the conditional handover information received from the first cellular base station 502. As shown, if the threshold conditions for performing conditional handover from the second cell to the third cell are met while the wireless device 506 is connected to the second cell, the wireless device 506 may further perform conditional handover from the second cell to the third cell using the conditional handover information. At least according to some embodiments, such conditional handovers in accordance with the conditional handover information may continue to be performed if conditions for them are met, or alternatively until one or more other events triggering cancellation or modification of the conditional handover information occur.

There may be any number of reasons/causes for conditional handover information to be discarded/cancelled. As one possibility, a serving cell of the wireless device 506 may provide an indication to discard/release the conditional handover information currently stored by the wireless device 506. Similarly, a serving cell of the wireless device 506 may provide updated conditional handover information to the wireless device 506, which may implicitly supercede and thus cancel any conditional handover information that was previously provided to the wireless device 506, or may include an explicit indication to discard/release any previously provided conditional handover information in conjunction with the updated conditional handover information. As another possibility, a serving cell of the wireless device 506 might configure a handover of the wireless device 506 (e.g., provide a handover command) that includes an indication to discard/release the conditional handover information currently stored by the wireless device 506, in which case the wireless device 506 may perform the handover in accordance with the handover command and release the conditional handover information. Note that it may also be possible for a serving cell of the wireless device to configure a handover of the wireless device 506 (e.g., provide a handover command) that includes an indication to keep the conditional handover information currently stored by the wireless device 506, in which case the wireless device 506 may perform the handover in accordance with the handover command and continue to retain the conditional handover information. In such a scenario the wireless device 506 may possibly perform conditional handover using the stored conditional handover information on one or more subsequent occasions.

At least according to some embodiments, conditional handover information may be associated with a single RRC connection. Thus, as another possibility, if the RRC connection of the wireless device 506 is released, the wireless device 506 may discard the conditional handover information, at least in some instances. Similarly, if the wireless device 506 detects radio link failure, and is unable to recover from the radio link failure on the same cell on which the radio link failure occurs, the wireless device 506 may discard the conditional handover information.

It should be noted that while it may be the case that a different cellular base station provides each cell for which conditional handover information is provided to the wireless device 506, as in the illustrated example of the first base station 502 and the first cell, the second base station 504 and the second cell, and the third base station 508 and the third cell, such a scenario should not be considered limiting to the disclosure as a whole. For example, it may also or alternatively be the case that a base station could provide multiple cells, such that conditional handover information could be provided for those multiple cells by the same base station. In such a scenario, a conditional handover request could be provided to the base station for multiple cells provided by the base station, and the response could include conditional handover information for those multiple cells. Similarly, a wireless device could perform a conditional handover from one cell provided by a base station to another cell provided by the same base station, e.g., if conditions for the conditional handover are met.

It should also be noted that, additionally or alternatively to performing consecutive conditional handovers for a primary or serving cell, the techniques described herein with respect to FIG. 5 may be used in conjunction with secondary cell changes. For example, in a system that supports carrier aggregation and/or dual connectivity, a wireless device could be configured to perform consecutive conditional secondary cell group (SCG) changes using the conditional handover information provision techniques described herein, at least according to some embodiments.

Thus, using the techniques described herein, it may be possible for a network to configure a wireless device to perform consecutive conditional handovers, and for a wireless device to perform consecutive conditional handovers. At least in some instances, such techniques may improve the robustness of handovers in cellular networks, such as in at least some high cell density deployment scenarios, among various possibilities.

FIGS. 6-16 and Additional Information

FIGS. 6-16 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Conditional handover techniques may be used to improve handover robustness in a cellular communication system, such as 3GPP 5G NR. Such techniques may include a cellular base station providing a handover command in advance to reduce or avoid the potential for legacy handover failure due to measurement result transmission failure or handover command transmission failure.

Figure 6:
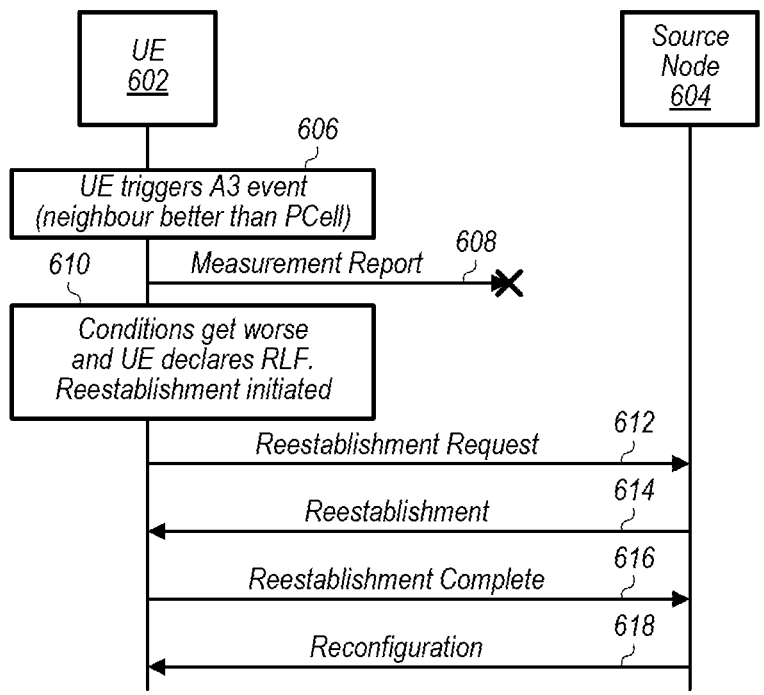
FIGS. 6-7 are signal flow diagrams illustrating aspects of exemplary possible scenarios in which handover failure may occur, according to some embodiments.

For example, FIG. 6 is a signal flow diagram illustrating aspects of a scenario in which measurement result transmission failure results in failure to perform handover and radio link failure. As shown, in 606, a UE 602 may trigger an A3 event (e.g., a neighbor cell may have better signal strength than the primary cell of the UE 602. In 608, the UE 602 may attempt to transmit a measurement report to the source node 604 that provides the primary cell, but the source node 604 may not receive the measurement report. In 610, wireless medium conditions between the UE 602 and the source node 604 may become worse, the UE 602 may declare radio link failure, and may initiate radio resource control reestablishment. In particular, the UE 602 may transmit a reestablishment request in 612, receive a reestablishment message in 614, transmit a reestablishment complete message in 616, and receive a reconfiguration message in 618.

Figure 7:
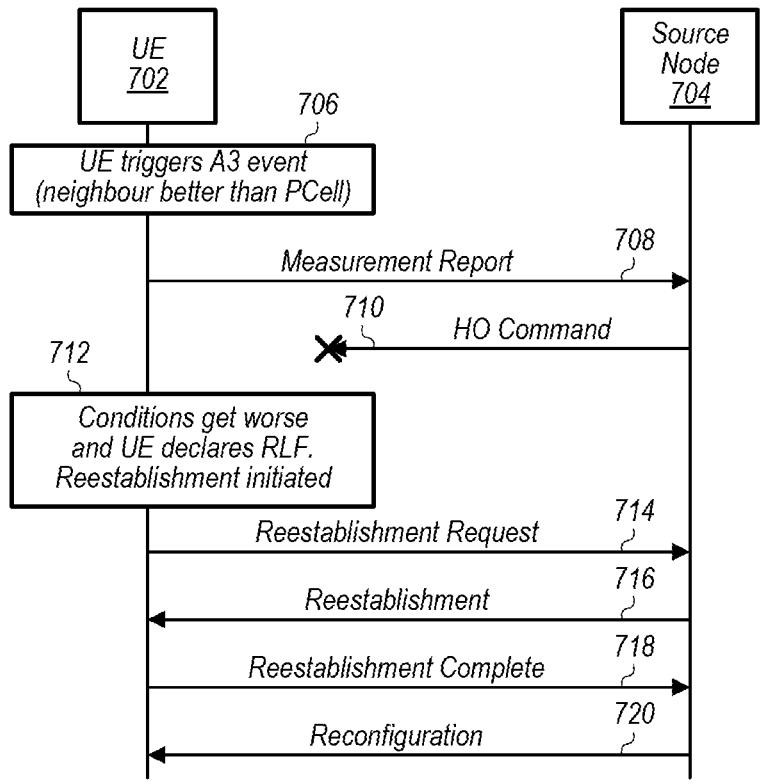

As another example, FIG. 7 is a signal flow diagram illustrating aspects of a scenario in which handover command transmission failure results in failure to perform handover and radio link failure. As shown, in 706, a UE 702 may trigger an A3 event (e.g., a neighbor cell may have better signal strength than the primary cell of the UE 702. In 708, the UE 702 may transmit a measurement report to the source node 704 that provides the primary cell, which may be received by the source node 704. In 710, the source node 704 may attempt to transmit a handover command to the UE 702, but the handover command may not be received by the UE 702. In 712, wireless medium conditions between the UE 702 and the source node 704 may become worse, the UE 702 may declare radio link failure, and may initiate radio resource control reestablishment. In particular, the UE 702 may transmit a reestablishment request in 714, receive a reestablishment message in 716, transmit a reestablishment complete message in 718, and receive a reconfiguration message in 720.

Figure 8:
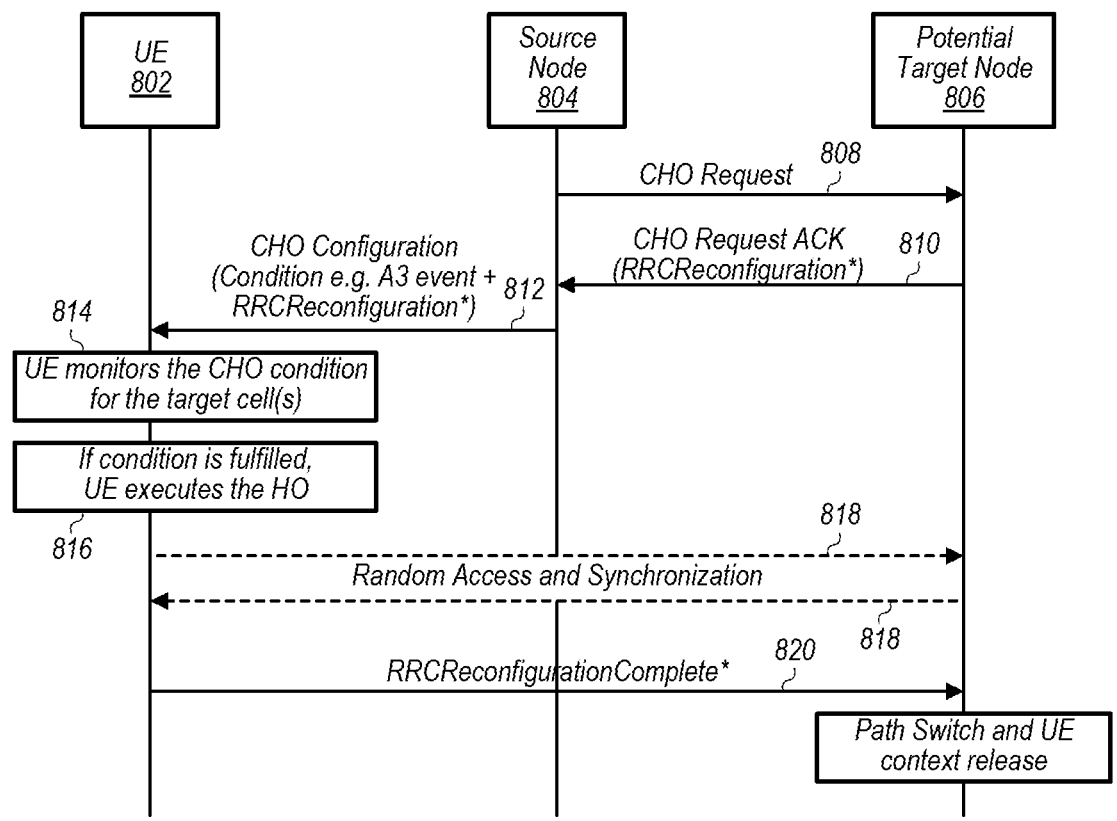
FIG. 8 is a signal flow diagram illustrating aspects of an exemplary possible scenario in which a conditional handover command is used.

In contrast, FIG. 8 is a signal flow diagram illustrating aspects of a scenario in which a conditional handover command is used to avoid such potential handover failure scenarios. As shown, in 808, a source node may provide a conditional handover request to a potential target node 806. In 810, the potential target node may provide a conditional handover request acknowledgement (e.g., including RRCReconfiguration information for the potential target node 806) to the source node 804. Note that multiple such conditional handover requests may be provided to multiple potential target nodes, e.g., to support provision of conditional handover information to a UE for multiple potential conditional handover target cells. In 812, the source node 804 may provide conditional handover configuration information (e.g., including condition information for triggering the conditional handover, such as an A3/A5 event, and RRCReconfiguration information for the potential target node 806, and possibly similar information for one or more other potential target cells) to the UE 802. In 814, the UE 802 may monitor the conditional handover condition for the target cell(s). In 816, if the condition for a conditional handover is fulfilled, the UE 802 may execute the handover. In the illustrated scenario, this may include performing random access and synchronization in 818, and receiving a RRCReconfigurationComplete message in 820. Once handover is complete, the potential target node (now serving cell) 806 may execute a parth switch and UE context release for the UE in the network. The UE 802 may also release configuration information for all conditional handover candidates after any (e.g., conditional or legacy) successful handover completion.

Figure 9:
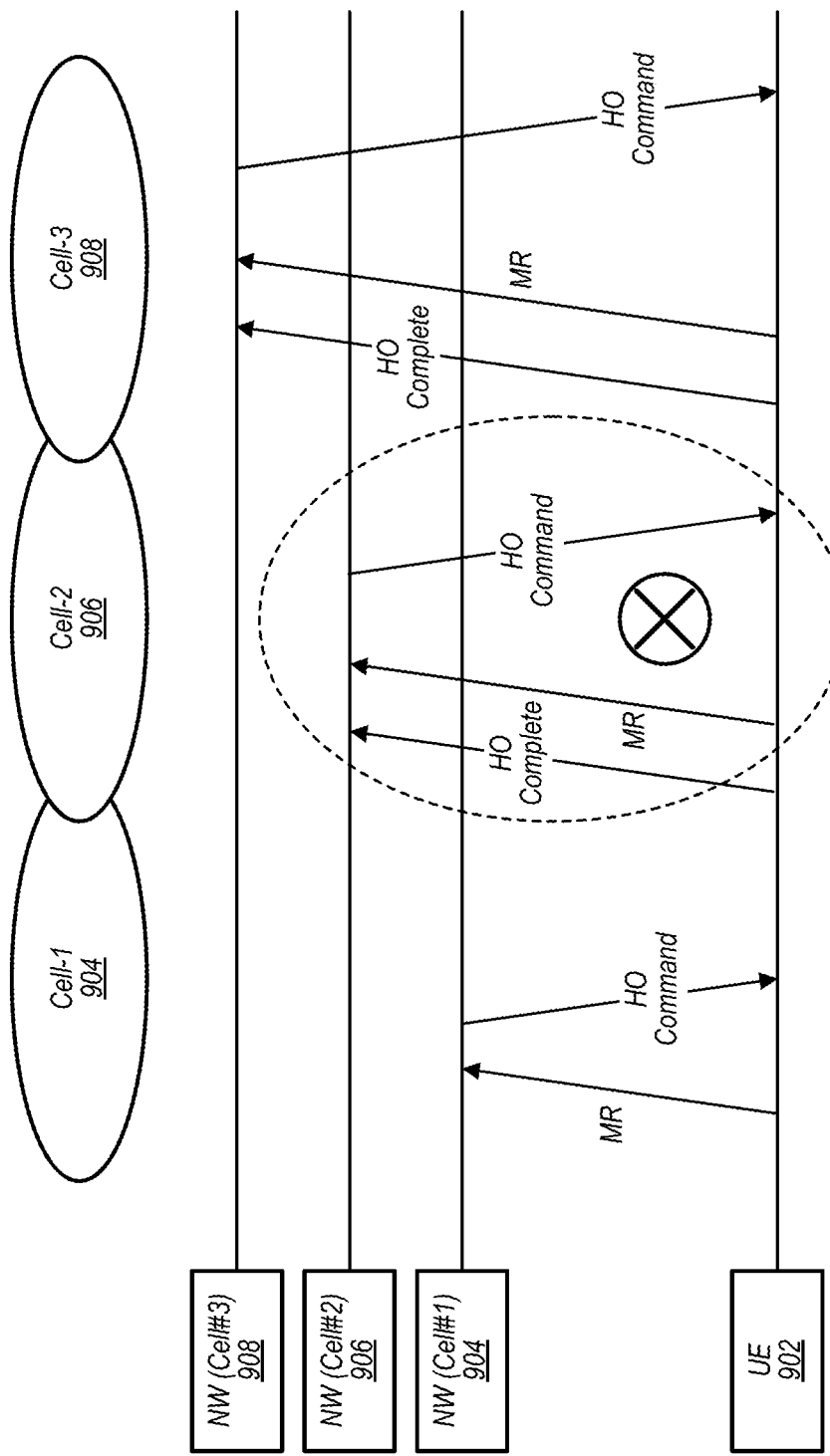
FIGS. 9-10 illustrate further aspects of exemplary possible scenarios in which handover failure may occur, according to some embodiments.

In some frequency ranges, such as the NR FR2 deployment, it may be the case that a relatively high cell density is provided, and that rapidly changing signal strength (e.g., RSRP) may be a common occurrence, e.g., due to directional antenna usage, which may have the potential to result in a relatively high number of handovers and radio link failures for wireless devices operating in those frequency ranges. Thus, scenarios in which legacy handover failure may occur, such as in the illustrated scenarios of FIGS. 6-7, may be relatively common. FIG. 9 illustrates further details of such a scenario in which legacy handover failure could occur, e.g., in such a frequency range with potential for rapidly changing wireless medium conditions. As shown, in the illustrated scenario a UE 902 may provide a measurement report (e.g., due to an A3 trigger, as one possibility) and receive a handover command from a first cell 904 of a network. The UE 902 may provide a handover complete message to a second cell 906 (e.g., the target of the handover command), and may attempt to provide a measurement report to the second cell 906 (e.g., due to another A3 trigger, as one possibility). However, due to conditions rapidly deteriorating on the second cell 906, the second cell 906 may not receive the measurement report from the UE 902, which may result in handover failure and potentially radio link failure. As a result, instead of completing handover to a third cell 908, or to any further cells, a service interruption may occur.

Figure 10:
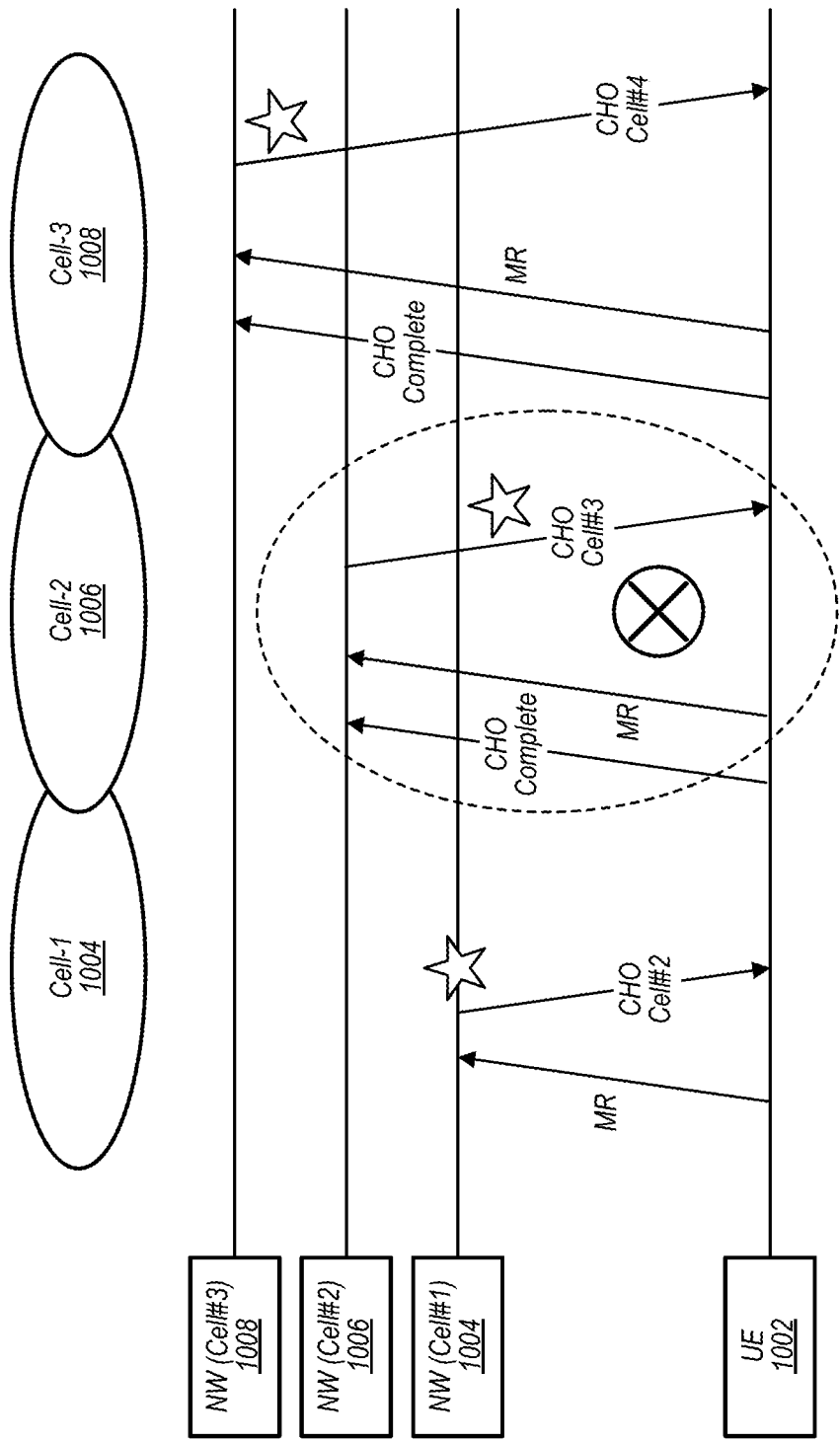

In such rapidly changing conditions with high cell density, it may be the case that even configuring a conditional handover may be insufficient to prevent eventual handover failure and possibly radio link failure. FIG. 10 illustrates further details of such a scenario in which conditional handover failure could occur. As shown, in the illustrated scenario a UE 1002 may provide a measurement report and receive a conditional handover command from a first cell 1004 of a network. The UE 1002 may determine that a condition for handover to a second cell 1006 is met, and may perform the handover, including providing a conditional handover complete message to the second cell 1006, and may attempt to provide a measurement report to the second cell 1006. However, due to conditions rapidly deteriorating on the second cell 1006, the second cell 1006 may not receive the measurement report from the UE 1002, which may result in handover failure and potentially radio link failure. As a result, instead of receiving a conditional handover command and completing handover to a third cell 908, or to any further cells, a service interruption may occur.

Thus, there is potential for service interruptions due to a short stay on a cell resulting in a wireless device being unable to transmit measurement reports and/or handover related messages in a timely manner and causing handover failure and radio link failure. One possible approach to attempting to mitigate the potential for such service interruptions may include expanding the conditional handover framework to support the possibility of configuring multiple (e.g., consecutive) conditional handovers.

In order to support the possibility of configuring consecutive conditional handovers with a conditional handover command, there may be handover preparation operations performed on the network side. Such operations may include each target node/cell providing the candidate cell's configuration and the conditional handover condition(s) for performing a conditional handover from that cell if a UE performs conditional handover in that candidate cell. The target node/cell may provide the candidate cell's configuration information as full configuration information or as delta configuration information. In the case that delta configuration information is provided, the delta may be relative to the current configuration of the source cell, as one possibility. The network may also explicitly indicate to a UE to keep the configuration information for candidate cells after handover completion, at least in some instances.

Upon a UE receiving a conditional handover command with such a 'keep' indication (e.g., indicating to keep the configuration information for candidate cells after handover completion), the UE may store the full configuration and conditional handover condition(s) of each candidate cell. If the network provides the candidate cell's configuration as delta configuration information (e.g., rather than full configuration information), it may be the case that the UE translates and stores the candidate cell's configuration information as full configuration information. For the conditional handover condition configuration that is used for the candidate cell, the UE may store such information with the candidate cell's configuration information. For the first conditional handover performed from a conditional handover command, the UE may use the conditional handover condition(s) configured via the current serving cell. Once the UE has performed conditional handover to one candidate cell successfully, the UE may apply that candidate cell's configuration, e.g., including the conditional handover condition(s) configured for use for potentially performing conditional handover from that cell. Upon UE handover completion success, the UE may keep all of the candidate cells' configuration information, e.g., for potentially performing further conditional handovers. In some instances, it may be possible (e.g., optionally) for the UE to remove the source cell from the candidate cell list. Note that such a framework and procedure may be applicable both for primary cell (PCell) changes (handovers) as well as secondary cell (SCell) changes (secondary cell group (SCG) changes), at least according to some embodiments.

Figure 11:
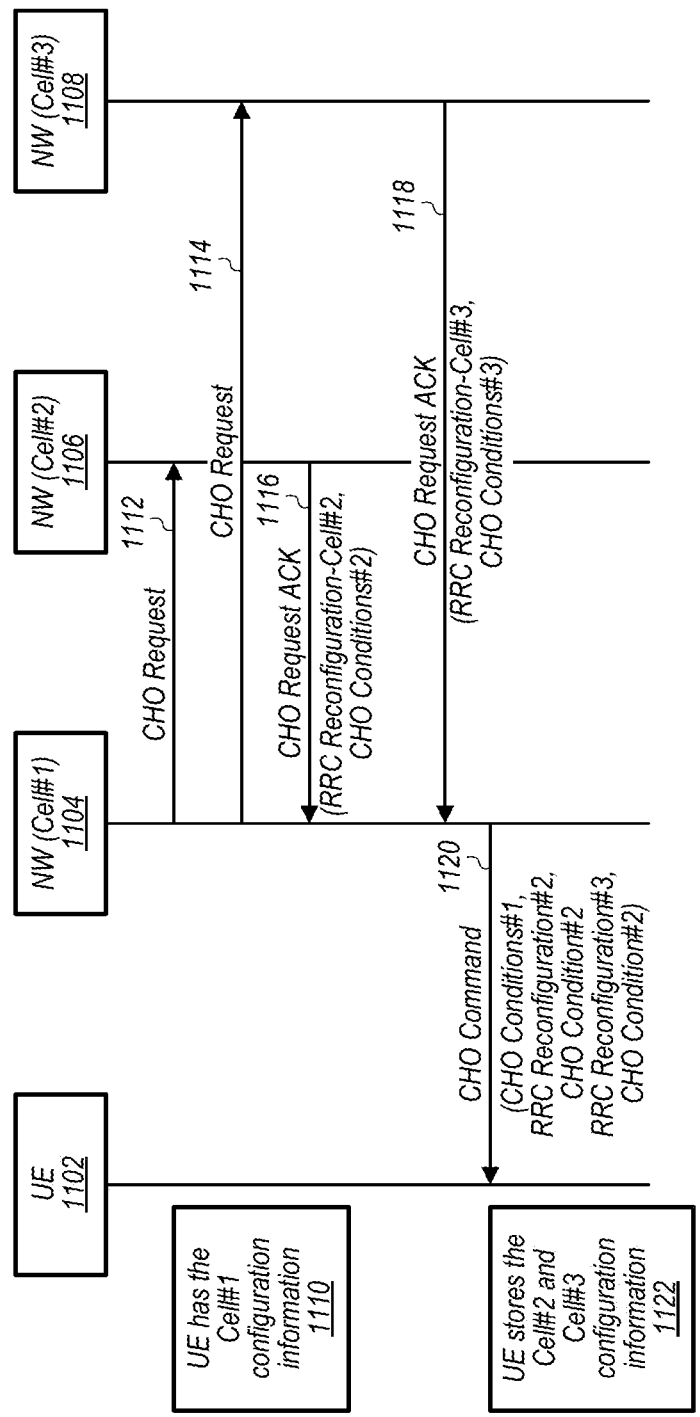
FIGS. 11-12 are signal flow diagrams illustrating aspects of exemplary possible approaches to configuring a wireless device to perform consecutive conditional handovers, according to some embodiments.

There may be multiple possible approaches to performing the network preparation for providing support for performing consecutive conditional handovers. FIG. 11 illustrates one such possible approach, in which a single conditional handover command is used to configure potential consecutive conditional handovers for multiple candidate cells. As shown, in the illustrated scenario, a UE 1102 may initially be connected to a first cell 1104, e.g., such that in 1110 the UE 1102 may have cell configuration information for the first cell 1104. The first cell 1104 may decide to trigger conditional handover and may transmit a conditional handover request to a second cell 1106 in 1112 and to transmit a conditional handover request to a third cell 1108 in 1114. The conditional handover requests may indicate the suggested candidate cells (e.g., the first cell 1104, the second cell 1106, and the third cell 1108) for potential further conditional handover(s). In 1116, the second cell 1106 may provide a conditional handover request acknowledgement to the first cell 1104. The acknowledgement may include RRC Reconfiguration information for the second cell 1106 and conditional handover conditions for performing handover from the second cell 1106 to the first cell 1104 and to the third cell 1108. In 1118, the third cell 1108 may provide a conditional handover request acknowledgement to the first cell 1104. The acknowledgement may include RRC Reconfiguration information for the third cell 1108 and conditional handover conditions for performing handover from the third cell 1108 to the first cell 1104 and to the second cell 1106. In 1120, the first cell 1104 may provide a conditional handover command to the UE 1102. The conditional handover command may include the conditional handover condition(s) for performing conditional handover from the first cell 1104, as well as configuration information for the second cell 1106 and conditional handover condition(s) for performing conditional handover from the second cell 1106, and configuration information for the third cell 1108 and conditional handover condition(s) for performing conditional handover from the third cell 1108. In 1122, when receiving the conditional handover command from the first cell 1104, the UE 1102 may store the full configuration information for the second cell 1106 and the third cell 1108, as well as the conditional handover conditions for performing conditional handover from each of the first cell 1104, the second cell 1106, and the third cell 1108.

Figure 12:
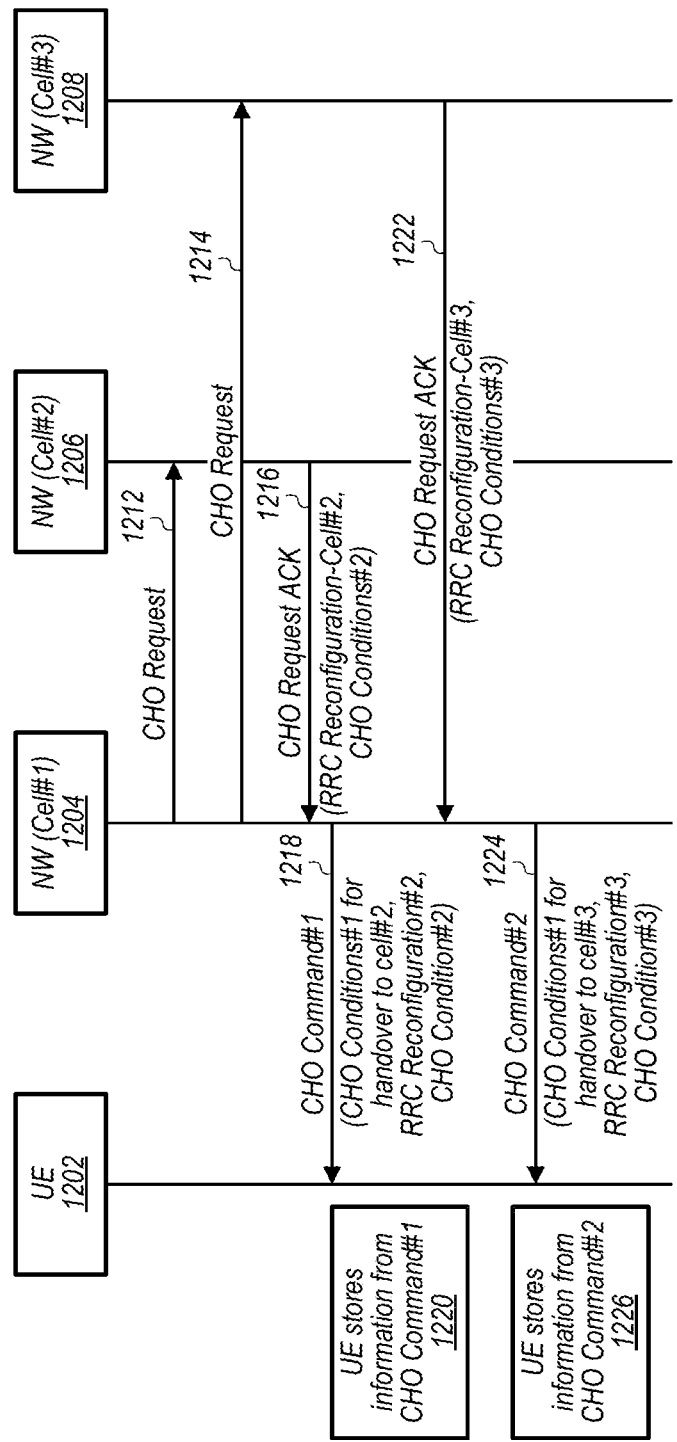

FIG. 12 illustrates another possible approach to performing the network preparation for providing support for performing consecutive conditional handovers, in which multiple conditional handover commands are used to configure potential consecutive conditional handovers for multiple candidate cells. As shown, in the illustrated scenario, a UE 1202 may initially be connected to a first cell 1204, e.g., such that the UE 1202 may have cell configuration information for the first cell 1204. The first cell 1204 may decide to trigger conditional handover and may transmit a conditional handover request to a second cell 1206 in 1212 and to transmit a conditional handover request to a third cell 1208 in 1214. The conditional handover requests may indicate the suggested candidate cells (e.g., the first cell 1204, the second cell 1206, and the third cell 1208) for potential further conditional handover(s). In 1216, the second cell 1206 may provide a conditional handover request acknowledgement to the first cell 1204. The acknowledgement may include RRC Reconfiguration information for the second cell 1206 and conditional handover conditions for performing handover from the second cell 1206 to the first cell 1204 and to the third cell 1208. In 1218, the first cell 1204 may provide a first conditional handover command to the UE 1202. The first conditional handover command may include the conditional handover condition(s) for performing conditional handover from the first cell 1204 to the second cell 1206, as well as configuration information for the second cell 1206 and conditional handover condition(s) for performing conditional handover from the second cell 1206. In 1220, when receiving the first conditional handover command from the first cell 1204, the UE 1202 may store the full configuration information for the second cell 1206, as well as the conditional handover conditions for performing conditional handover from the first cell 1204 to the second cell 1206, and the conditional handover conditions for performing conditional handover from the second cell 1106. In 1222, the third cell 1208 may provide a conditional handover request acknowledgement to the first cell 1204. The acknowledgement may include RRC Reconfiguration information for the third cell 1208 and conditional handover conditions for performing handover from the third cell 1208 to the first cell 1204 and to the second cell 1206. In 1224, the first cell 1204 may provide a second conditional handover command to the UE 1202. The second conditional handover command may include the conditional handover condition(s) for performing conditional handover from the first cell 1204 to the third cell 1208, as well as configuration information for the third cell 1208 and conditional handover condition(s) for performing conditional handover from the third cell 1208. In 1226, when receiving the second conditional handover command from the first cell 1204, the UE 1202 may store the full configuration information for the third cell 1208, as well as the conditional handover conditions for performing conditional handover from the first cell 1204 to the third cell 1208, and the conditional handover conditions for performing conditional handover from the third cell 1108.

Figure 13:
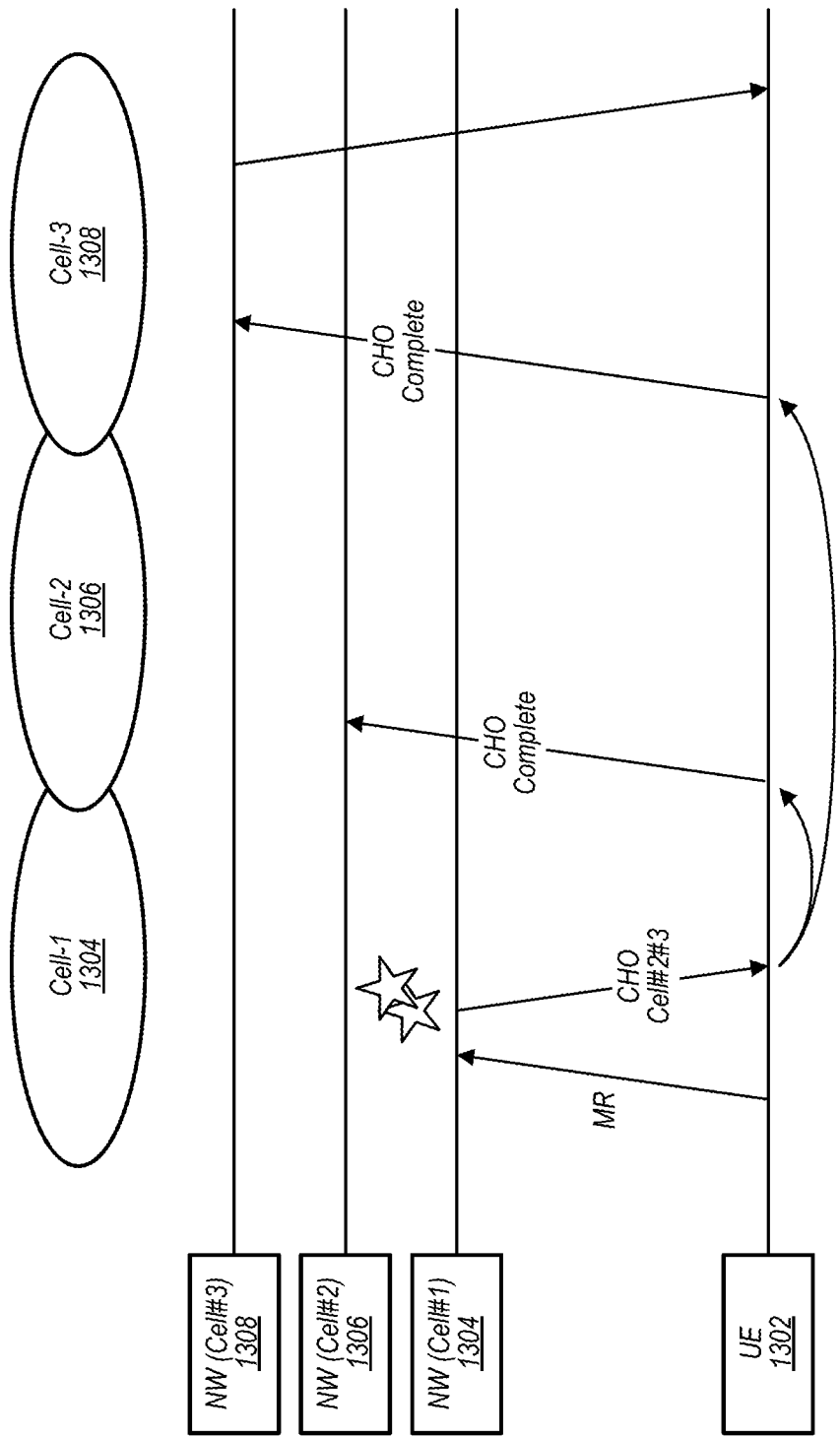
FIG. 13 illustrates further aspects of an exemplary possible scenario in which a wireless device is configured to perform consecutive conditional handovers, according to some embodiments.

Once network preparation for supporting consecutive conditional handovers by a UE is complete (e.g., in accordance with the illustrated scenario of FIG. 11, the illustrated scenario of FIG. 12, or any of various other approaches to performing such network preparation), the UE may be configured to perform consecutive conditional handovers. FIG. 13 illustrates further details of how such consecutive conditional handovers could be performed by a UE, according to some embodiments. In the illustrated scenario, a UE 1302 may initially be connected to a first cell 1304. The UE 1302 may provide a measurement report to the first cell 1304, which may provide a conditional handover command configuring possible consecutive conditional handovers with a second cell 1306 and a third cell 1308. The UE 1302 may store the full configuration information for the first cell 1304, the second cell 1306, and the third cell 1308, as well as the conditional handover conditions for performing conditional handover from each of the first cell 1304, the second cell 1306, and the third cell 1308. While the UE 1302 remains connected to the first cell 1304, the UE may apply the conditional handover conditions for performing conditional handover from the first cell 1304 when evaluating the second cell 1306 and the third cell 1308. In the illustrated scenario, the condition for performing conditional handover from the first cell 1304 to the second cell 1306 may be met, and the UE 1302 may execute the handover to the second cell 1306, e.g., including providing a conditional handover complete message to the second cell 1306. After handover completion to the second cell 1306, the UE 1302 may keep all the configuration and conditional handover information, may apply the configuration information for the second cell 1306 with respect to data communication, may inform the second cell 1306 that the UE 1302 holds consecutive conditional handover configuration information for the first cell 1304, the second cell 1306, and the third cell 1308, and may apply the conditional handover conditions for evaluating the first cell 1304 and the third cell 1308. Note that in a framework in which separate conditional handover commands are used to configure potential consecutive conditional handovers to different cells, such as in the illustrated scenario of FIG. 9, if the UE 1302 performs the conditional handover to the second cell 1306 before the UE 1302 receives a conditional handover command including conditional handover configuration information for the third cell 1308, the UE 1302 may instead inform the second cell 1306 that the UE 1302 holds consecutive conditional handover configuration information for the first cell 1304 and the second cell 1306 (but not the third cell 1308).

In the illustrated scenario of FIG. 13, while connected to the second cell 1306, the condition for performing conditional handover from the second cell 1306 to the third cell 1308 may be met, and the UE 1302 may execute the handover to the third cell 1308, e.g., including providing a conditional handover complete message to the third cell 1308. Again, after handover completion to the third cell 1308, the UE 1302 may keep all the configuration and conditional handover information, may apply the configuration information for the third cell 1308 with respect to data communication, may inform the third cell 1308 that the UE 1302 holds consecutive conditional handover configuration information for the first cell 1304, the second cell 1306, and the third cell 1308, and may apply the conditional handover conditions for evaluating the first cell 1304 and the second cell 1306. Note that at any time during such a scenario, it may be possible for the current conditional handover configuration of the UE 1302 to be overridden by a new configuration by the network, and/or for the current conditional handover configuration of the UE 1302 to be released by a network release indication, at least according to some embodiments.

Figure 14:
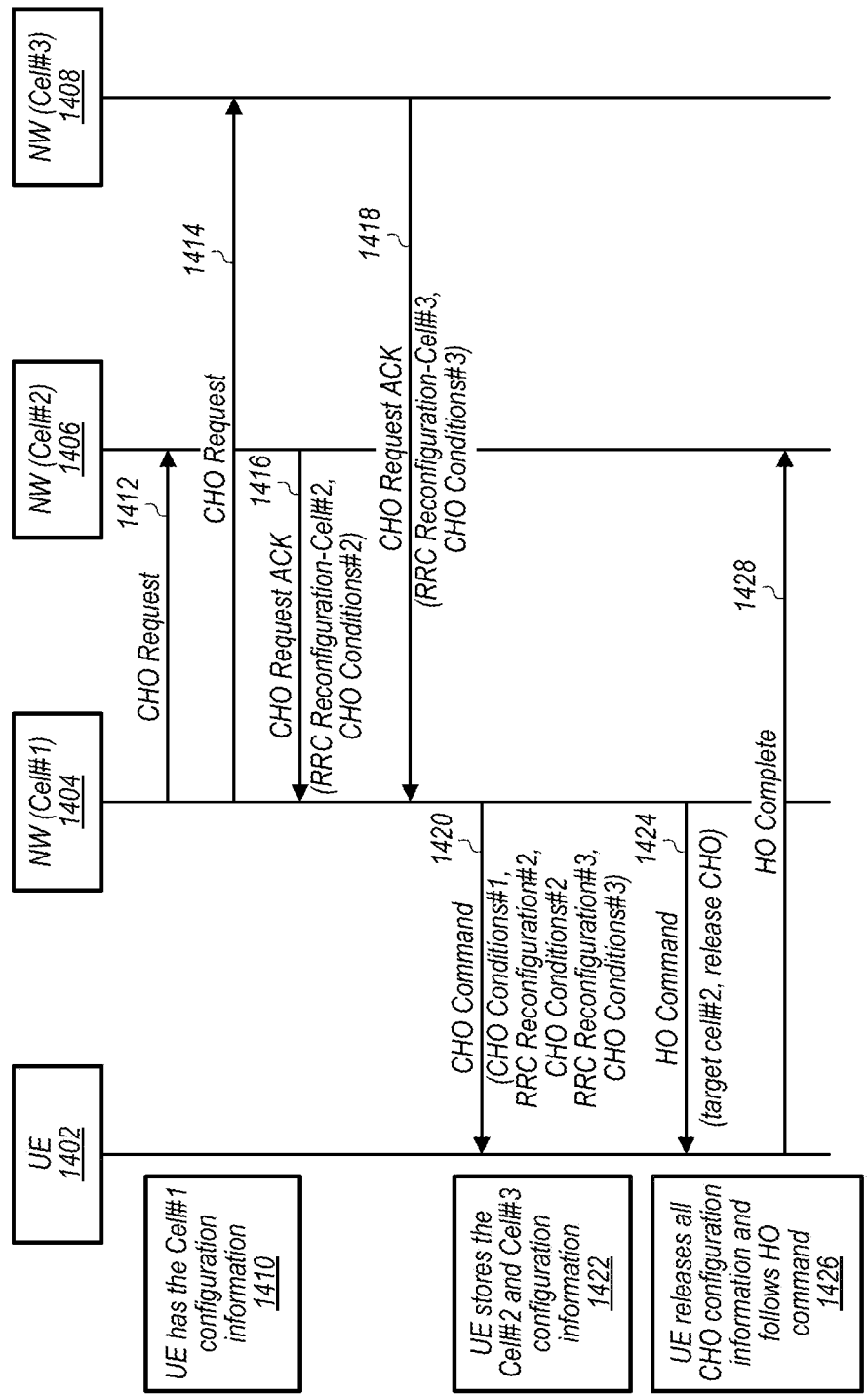
FIGS. 14-15 are signal flow diagrams illustrating aspects of exemplary possible scenarios in which a handover command is provided to a wireless device that has been configured to perform consecutive conditional handovers, according to some embodiments.
Figure 15:
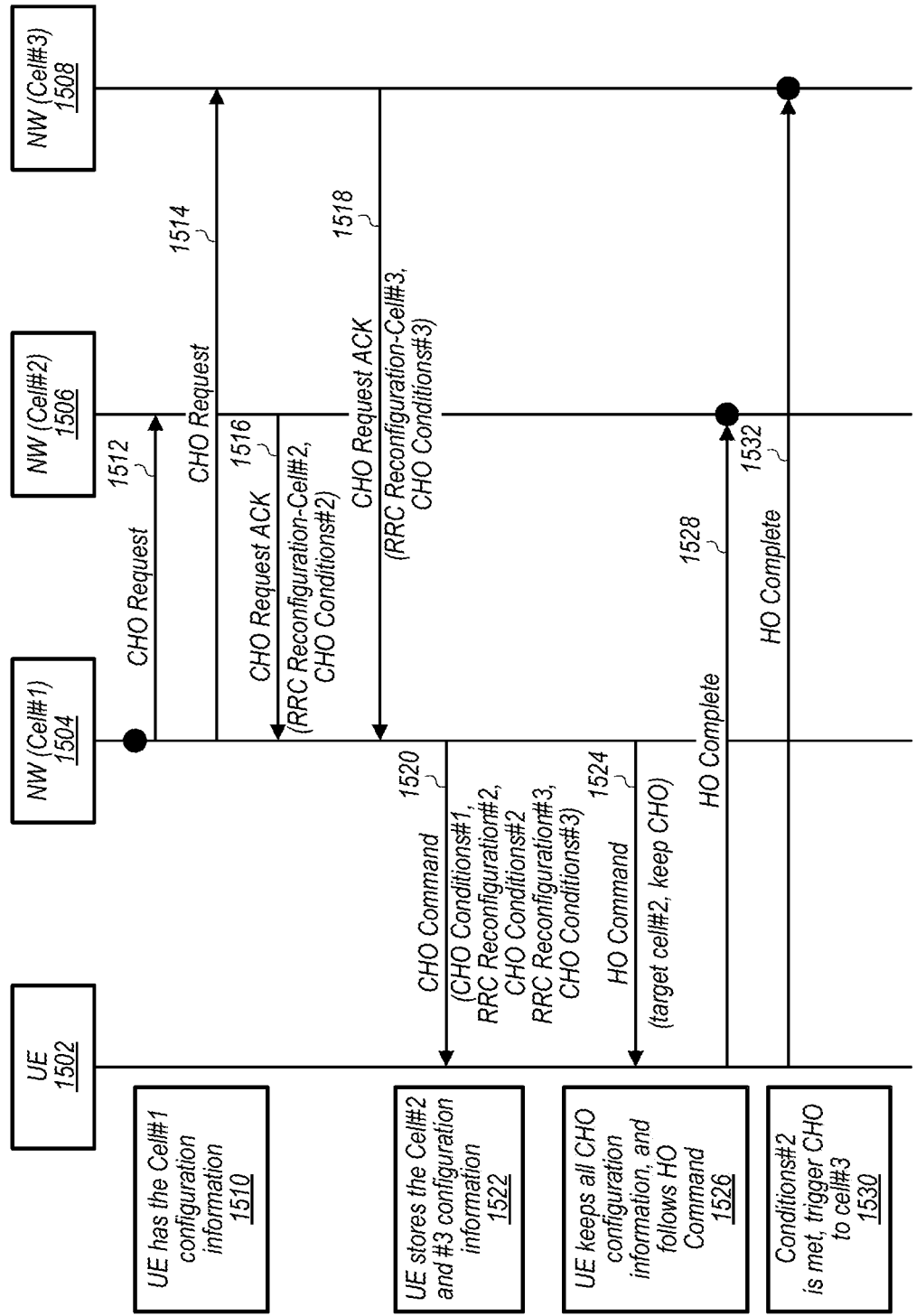

Additionally, there may be multiple possibilities for whether to continue using conditional handover configuration information if an explicit handover command is provided to a UE while the UE has conditional handover configuration information. FIGS. 14-15 are signal flow diagrams illustrating aspects of exemplary such scenarios in which a handover command is provided to a wireless device that has been configured to perform consecutive conditional handovers, according to some embodiments.

In the scenario of FIG. 14, a UE 1402 may initially be connected to a first cell 1404, e.g., such that in 1410 the UE 1402 may have cell configuration information for the first cell 1404. The first cell 1404 may decide to trigger conditional handover and may transmit a conditional handover request to a second cell 1406 in 1412 and to transmit a conditional handover request to a third cell 1408 in 1414. The conditional handover requests may indicate the suggested candidate cells (e.g., the first cell 1404, the second cell 1406, and the third cell 1408) for potential further conditional handover(s). In 1416, the second cell 1406 may provide a conditional handover request acknowledgement to the first cell 1404. The acknowledgement may include RRC Reconfiguration information for the second cell 1406 and conditional handover conditions for performing handover from the second cell 1406 to the first cell 1404 and to the third cell 1408. In 1418, the third cell 1408 may provide a conditional handover request acknowledgement to the first cell 1404. The acknowledgement may include RRC Reconfiguration information for the third cell 1408 and conditional handover conditions for performing handover from the third cell 1408 to the first cell 1404 and to the second cell 1406. In 1420, the first cell 1404 may provide a conditional handover command to the UE 1402. The conditional handover command may include the conditional handover condition(s) for performing conditional handover from the first cell 1404, as well as configuration information for the second cell 1406 and conditional handover condition(s) for performing conditional handover from the second cell 1406, and configuration information for the third cell 1408 and conditional handover condition(s) for performing conditional handover from the third cell 1408. In 1422, when receiving the conditional handover command from the first cell 1404, the UE 1402 may store the full configuration information for the second cell 1406 and the third cell 1408, as well as the conditional handover conditions for performing conditional handover from each of the first cell 1404, the second cell 1406, and the third cell 1408. In 1424, the first cell 1404 may provide a handover command to the UE 1402, in which the first cell 1404 instructs the UE 1402 to target the second cell 1404 for the handover, and to release the conditional handover information that was provided to the UE 1402. In 1426, the UE 1402 may release the conditional handover configuration information and follow the handover command, e.g., including providing a handover complete message to the second cell 1406 in 1428.

In the scenario of FIG. 15, a UE 1502 may initially be connected to a first cell 1504, e.g., such that in 1510 the UE 1502 may have cell configuration information for the first cell 1504. The first cell 1504 may decide to trigger conditional handover and may transmit a conditional handover request to a second cell 1506 in 1512 and to transmit a conditional handover request to a third cell 1508 in 1514. The conditional handover requests may indicate the suggested candidate cells (e.g., the first cell 1504, the second cell 1506, and the third cell 1508) for potential further conditional handover(s). In 1516, the second cell 1506 may provide a conditional handover request acknowledgement to the first cell 1504. The acknowledgement may include RRC Reconfiguration information for the second cell 1506 and conditional handover conditions for performing handover from the second cell 1506 to the first cell 1504 and to the third cell 1508. In 1518, the third cell 1508 may provide a conditional handover request acknowledgement to the first cell 1504. The acknowledgement may include RRC Reconfiguration information for the third cell 1508 and conditional handover conditions for performing handover from the third cell 1508 to the first cell 1504 and to the second cell 1506. In 1520, the first cell 1504 may provide a conditional handover command to the UE 1502. The conditional handover command may include the conditional handover condition(s) for performing conditional handover from the first cell 1504, as well as configuration information for the second cell 1506 and conditional handover condition(s) for performing conditional handover from the second cell 1506, and configuration information for the third cell 1508 and conditional handover condition(s) for performing conditional handover from the third cell 1508. In 1522, when receiving the conditional handover command from the first cell 1504, the UE 1502 may store the full configuration information for the second cell 1506 and the third cell 1508, as well as the conditional handover conditions for performing conditional handover from each of the first cell 1504, the second cell 1506, and the third cell 1508. In 1524, the first cell 1504 may provide a handover command to the UE 1502, in which the first cell 1504 instructs the UE 1502 to target the second cell 1504 for the handover, and to keep the conditional handover information that was provided to the UE 1502. In 1526, the UE 1502 may keep the conditional handover configuration information and follow the handover command, e.g., including providing a handover complete message to the second cell 1506 in 1528. In 1530, the UE 1502 may determine that a condition for triggering conditional handover to the third cell 1508 may be met, and so may perform the conditional handover to the third cell 1508, e.g., including providing a handover complete message to the third cell 1508 in 1532.

Figure 16:
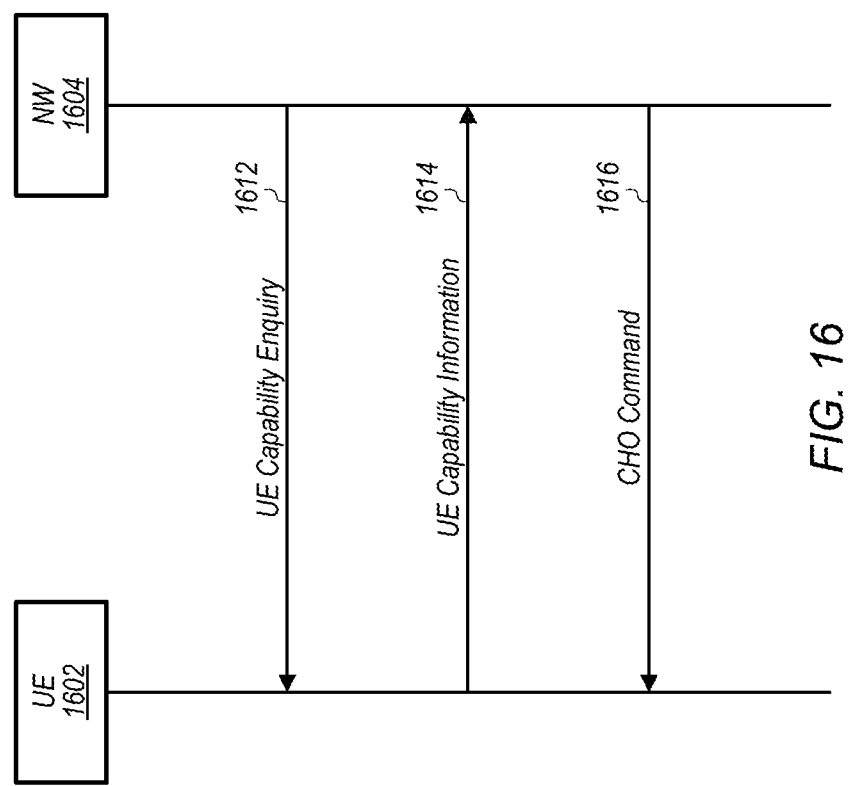
FIG. 16 is a signal flow diagram illustrating aspects of an exemplary possible scenario in which a wireless device provides capability information indicating whether consecutive conditional handover is supported by the wireless device, according to some embodiments.

FIG. 16 is a signal flow diagram illustrating aspects of an exemplary possible scenario in which a wireless device provides capability information indicating whether consecutive conditional handover is supported by the wireless device, according to some embodiments. As shown, in 1612, a network 1604 may provide a UE capability enquiry to a UE 1602. The UE capability enquiry may represent a request for the UE to provide any of a variety of types of capability information, such as band capabilities, whether various features are supported by the UE, and/or any of various other types of information. One such possible type of information may include information regarding conditional handover capabilities of the UE 1602.

In 1614, the UE 1602 may respond to the UE capability enquiry by providing the requested UE capability information. This may include an indication of any or all of whether the UE 1602 supports conditional handover, whether the UE 1602 supports consecutive conditional handover, whether the UE 1602 supports multiple conditional handover candidate cells, a maximum number of conditional handover candidate cells supported by the UE 1602, and/or any of various other types of information.

In 1616, the network 1604 may provide a conditional handover command to the UE 1602. The network may determine to provide the conditional handover command, and/or may select certain aspects of the conditional handover information provided in the conditional handover command, based at least in part on the UE capability information provided by the UE 1602. For example, the network may only provide the conditional handover command to the UE 1602 if the UE capability information indicates that the UE 1602 can support conditional handover. Further, the number of cells for which conditional handover information is provided may be selected to be less than or equal to the maximum number of conditional handover candidate cells supported by the UE 1602. The network 1604 may additionally or alternatively base whether to provide the conditional handover command to the UE 1602 and/or which information to include in the conditional handover command on any of various other possible types of capability information provided by the UE 1602, among other possible considerations, according to various embodiments.

In the following further exemplary embodiments are provided.

One set of embodiments may include an apparatus, comprising: a processor configured to cause a wireless device to: receive conditional handover information from a first cellular base station, wherein the conditional handover information supports consecutive conditional handovers; perform a first conditional handover using the conditional handover information received from the first cellular base station; and retain the conditional handover information received from the first cellular base station after the first conditional handover.

According to some embodiments, the processor is further configured to cause the wireless device to: perform a second conditional handover using the conditional handover information received from the first cellular base station.

According to some embodiments, the first conditional handover is from a first cell provided by the first cellular base station to a second cell that is provided by a second cellular base station, wherein the second conditional handover is from the second cell to a third cell that is provided by a third cellular base station.

According to some embodiments, the processor is further configured to cause the wireless device to: receive a handover command that indicates to release conditional handover information; perform handover in accordance with the handover command; and release the conditional handover information based at least in part on the handover command.

According to some embodiments, the processor is further configured to cause the wireless device to: receive a handover command that indicates to keep conditional handover information; perform handover in accordance with the handover command; and retain the conditional handover information received from the first cellular base station based at least in part on the handover command.

According to some embodiments, the processor is further configured to cause the wireless device to: provide capability information to the first cellular base station, wherein the capability information indicates that the wireless device supports conditional handover information configuring consecutive conditional handovers.

According to some embodiments, the capability information further indicates a maximum amount of conditional handover information supported by the wireless device.

Another set of embodiments may include a wireless device, comprising: an antenna; a radio operably coupled to the antenna; and a processor operably coupled to the radio; wherein the wireless device configured to: receive conditional handover information from a cellular base station while the wireless device is connected to a first cell provided by the cellular base station, wherein the conditional handover information includes information for performing conditional handover from the first cell to at least a second cell and information for performing conditional handover from the second cell to at least a third cell; perform conditional handover from the first cell to the second cell using the conditional handover information, wherein after the conditional handover from the first cell to the second cell the wireless device is connected to the second cell; and perform conditional handover from the second cell to the third cell using the conditional handover information, wherein after the conditional handover from the second cell to the third cell the wireless device is connected to the third cell.

According to some embodiments, the information for performing conditional handover from the first cell to the second cell includes configuration information for the second cell, wherein after the conditional handover from the first cell to the second cell the wireless device communicates with the second cell in accordance with the configuration information for the second cell.

According to some embodiments, the information for performing conditional handover from the first cell to the second cell specifies one or more conditions under which to perform conditional handover from the first cell to the second cell, wherein the wireless device is further configured to: determine that the one or more conditions under which to perform conditional handover from the first cell to the second cell are met while connected to the first cell, wherein conditional handover from the first cell to the second cell is performed based at least in part on determining that the one or more conditions under which to perform conditional handover from the first cell to the second cell are met while connected to the first cell.

According to some embodiments, the information for performing conditional handover from the second cell to the third cell specifies one or more conditions under which to perform conditional handover from the second cell to the third cell, wherein the wireless device is further configured to: determine that the one or more conditions under which to perform conditional handover from the second cell to the third cell are met while connected to the second cell, wherein conditional handover from the second cell to the third cell is performed based at least in part on determining that the one or more conditions under which to perform conditional handover from the second cell to the third cell are met while connected to the second cell.

According to some embodiments, the wireless device is further configured to: receive conditional handover information from the cellular base station including information for performing a conditional handover from the first cell to the third cell and information for performing a conditional handover from the third cell to the second cell.

According to some embodiments, the wireless device is further configured to: retain the conditional handover information received from the first cellular base station until an indication is received to release the conditional handover information.

Yet another set of embodiments may include a first cellular base station configured to provide a first cell, comprising: an antenna; a radio operably coupled to the antenna; and a processor operably coupled to the radio; wherein the first cellular base station is configured to: provide a conditional handover request to a second cellular base station that is configured to provide a second cell; receive a response to the conditional handover request from the second cellular base station, wherein the response includes information for performing conditional handover from the second cell to at least a third cell; and provide conditional handover information to a wireless device, wherein the conditional handover information includes information for performing conditional handover from the first cell to at least the second cell and the information for performing a conditional handover from the second cell to at least a third cell.

According to some embodiments, the first cellular base station is further configured to: provide a conditional handover request to a third cellular base station that is configured to provide the third cell; receive a response to the conditional handover request from the third cellular base station, wherein the response includes information conditional handover information for performing a conditional handover from the third cell to at least the second cell, wherein conditional handover information further includes information for performing conditional handover from the first cell to at least the third cell and the information for performing conditional handover from the third cell to at least the second cell.

According to some embodiments, the first cellular base station is further configured to: provide a handover command to the wireless device, wherein the handover command indicates to release conditional handover information.

According to some embodiments, the first cellular base station is further configured to: provide a handover command to the wireless device, wherein the handover command indicates to keep conditional handover information.

According to some embodiments, the first cellular base station is further configured to: receive capability information from the wireless device, wherein the capability information indicates that the wireless device supports conditional handover information configuring consecutive conditional handovers, wherein the first cellular base station is configured to provide the conditional handover information to the wireless device based at least in part on the capability information received from the wireless device.

According to some embodiments, the conditional handover request indicates a set of candidate cells for which conditional handover information is requested, wherein the set of candidate cells for which conditional handover information is requested includes at least the second cell and the third cell.

According to some embodiments, the response to the conditional handover request from the second cellular base station further includes cell configuration information for the second cell, wherein the information for performing conditional handover from the second cell to at least the third cell specifies one or more conditions under which to perform conditional handover from the second cell to the third cell.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
provide capability information to a first cellular base station, wherein the capability information indicates that the wireless device supports configuration of consecutive conditional handovers;
receive conditional handover information from the first cellular base station, wherein the conditional handover information includes information to support performing consecutive conditional handovers and explicitly indicates to keep the conditional handover information after handover completion;
perform a first conditional handover using the conditional handover information received from the first cellular base station; and
retain the conditional handover information received from the first cellular base station after the first conditional handover.

2. The apparatus of claim 1, wherein the processor is further configured to cause the wireless device to:
perform a second conditional handover using the conditional handover information received from the first cellular base station.

3. The apparatus of claim 2,
wherein the first conditional handover is from a first cell provided by the first cellular base station to a second cell that is provided by a second cellular base station,
wherein the second conditional handover is from the second cell to a third cell that is provided by a third cellular base station or to the first cell provided by the first cellular base station.

4. The apparatus of claim 1, wherein the processor is further configured to cause the wireless device to:
receive a handover command that indicates to release conditional handover information;

perform handover in accordance with the handover command; and release the conditional handover information based at least in part on the handover command.

5. The apparatus of claim 1, wherein providing the conditional handover information reduces the likelihood that a handover failure occurs after performing a conditional handover due to a reduced time on a target cell of the conditional handover.

6. The apparatus of claim 1, wherein the capability information further indicates a maximum amount of conditional handover information supported by the wireless device.

7. A wireless device, comprising:

an antenna;

a radio operably coupled to the antenna; and a processor operably coupled to the radio;

wherein the wireless device configured to:

provide capability information to a cellular base station, wherein the capability information indicates that the wireless device supports configuration of consecutive conditional handovers;

receive conditional handover information from the cellular base station while the wireless device is connected to a first cell provided by the cellular base station, wherein the conditional handover information explicitly indicates to keep the conditional handover information after handover completion and includes information for performing conditional handover from the first cell to at least a second cell and information for performing conditional handover from the second cell to at least a third cell;

perform conditional handover from the first cell to the second cell using the conditional handover information, wherein after the conditional handover from the first cell to the second cell the wireless device is connected to the second cell; and perform conditional handover from the second cell to the third cell using the conditional handover information, wherein after the conditional handover from the second cell to the third cell the wireless device is connected to the third cell.

8. The wireless device of claim 7, wherein the information for performing conditional handover from the first cell to the second cell includes configuration information for the second cell, wherein after the conditional handover from the first cell to the second cell the wireless device communicates with the second cell in accordance with the configuration information for the second cell.

9. The wireless device of claim 7, wherein the information for performing conditional handover from the first cell to the second cell specifies one or more conditions under which to perform conditional handover from the first cell to the second cell, wherein the wireless device is further configured to:

determine that the one or more conditions under which to perform conditional handover from the first cell to the second cell are met while connected to the first cell, wherein conditional handover from the first cell to the second cell is performed based at least in part on determining that the one or more conditions under which to perform conditional handover from the first cell to the second cell are met while connected to the first cell.

10. The wireless device of claim 7, wherein the information for performing conditional handover from the second cell to the third cell specifies one or more conditions under which to perform conditional handover from the second cell to the third cell, wherein the wireless device is further configured to:

determine that the one or more conditions under which to perform conditional handover from the second cell to the third cell are met while connected to the second cell, wherein conditional handover from the second cell to the third cell is performed based at least in part on determining that the one or more conditions under which to perform conditional handover from the second cell to the third cell are met while connected to the second cell.

11. The wireless device of claim 7, wherein the wireless device is further configured to:

receive conditional handover information from the cellular base station including information for performing a conditional handover from the first cell to the third cell and information for performing a conditional handover from the third cell to the second cell.

12. The wireless device of claim 7, wherein the wireless device is further configured to:

retain the conditional handover information received from the first cellular base station until an indication is received to release the conditional handover information.

13. A first cellular base station, comprising:

an antenna;

a radio operably coupled to the antenna; and a processor operably coupled to the radio;

wherein the first cellular base station is configured to:

provide a first cell;

provide a conditional handover request to a second cellular base station that is configured to provide a second cell;

receive a response to the conditional handover request from the second cellular base station, wherein the response includes first information for performing conditional handover from the second cell to at least a third cell;

receive capability information from the wireless device, wherein the capability information indicates that the wireless device supports configuration of consecutive conditional handovers; and provide, via the first cell, second conditional handover information to a wireless device, wherein the second conditional handover information explicitly indicates to keep the second conditional handover information after handover completion and includes a first portion of information for performing conditional handover from the first cell to at least the second cell and a second portion of information for performing the conditional handover from the second cell to at least the third cell.

14. The first cellular base station of claim 13, wherein the first cellular base station is further configured to:

provide a conditional handover request to a third cellular base station that is configured to provide the third cell;

receive a response to the conditional handover request from the third cellular base station, wherein the response includes third conditional handover information for performing a conditional handover from the third cell to at least the second cell, wherein the third conditional handover information further includes a third portion of information for performing conditional handover from the first cell to at least the third cell and a fourth portion of information for performing conditional handover from the third cell to at least the second cell.

15. The first cellular base station of claim 13, wherein the first cellular base station is further configured to:
provide a handover command to the wireless device, wherein the handover command indicates to release the second conditional handover information.

16. The first cellular base station of claim 13, wherein the first cellular base station is further configured to:
provide a handover command to the wireless device, wherein the handover command indicates to keep the second conditional handover information.

17. The first cellular base station of claim 13,
wherein the first cellular base station is configured to provide the second conditional handover information to the wireless device based at least in part on the capability information received from the wireless device.

18. The first cellular base station of claim 13,
wherein the conditional handover request indicates a set of candidate cells for which the second conditional handover information is requested, wherein the set of candidate cells for which the second conditional handover information is requested includes at least the second cell and the third cell.

19. The first cellular base station of claim 13,
wherein the response to the conditional handover request from the second cellular base station further includes cell configuration information for the second cell,
wherein the first information for performing conditional handover from the second cell to at least the third cell specifies one or more conditions under which to perform conditional handover from the second cell to the third cell.

* * * * *